(12) United States Patent
Nyberg

(10) Patent No.: US 11,116,199 B2
(45) Date of Patent: Sep. 14, 2021

(54) ACOUSTIC LETHAL OVITRAP

(71) Applicant: Herbert Joseph Nyberg, Old Lyme, CT (US)

(72) Inventor: Herbert Joseph Nyberg, Old Lyme, CT (US)

( * ) Notice: Subject to any disclaimer, the term of this patent is extended or adjusted under 35 U.S.C. 154(b) by 162 days.

(21) Appl. No.: 16/302,736

(22) PCT Filed: May 22, 2017

(86) PCT No.: PCT/US2017/033798
§ 371 (c)(1),
(2) Date: Nov. 19, 2018

(87) PCT Pub. No.: WO2017/201524
PCT Pub. Date: Nov. 23, 2017

(65) Prior Publication Data
US 2019/0313620 A1    Oct. 17, 2019

Related U.S. Application Data

(60) Provisional application No. 62/339,360, filed on May 20, 2016.

(51) Int. Cl.
*A01M 1/10* (2006.01)
*A01M 1/04* (2006.01)
*A01M 1/22* (2006.01)

(52) U.S. Cl.
CPC .............. *A01M 1/106* (2013.01); *A01M 1/04* (2013.01); *A01M 1/22* (2013.01); *A01M 2200/012* (2013.01)

(58) Field of Classification Search
CPC ........ A01M 1/026; A01M 1/04; A01M 1/106; A01M 1/22; A01M 1/226; A01M 2200/012

(Continued)

(56) References Cited

U.S. PATENT DOCUMENTS 2,861,132 A  * 11/1958 Kahn ..................... A01M 1/023
                                                               369/174
RE35,348 E  * 10/1996 Georgi ................. A01K 67/033
                                                               119/6.6

(Continued)

FOREIGN PATENT DOCUMENTS

FR           2901960 A1    12/2007
WO       2006028765 A1     3/2006
WO       2009058101 A1     5/2009

OTHER PUBLICATIONS

International search report for patent application No. PCT/US2017/033798 dated Jul. 18, 2017.

(Continued)

*Primary Examiner* — Bradley W Frazier
(74) *Attorney, Agent, or Firm* — Bachman and Lapointe PC; George Coury

(57) ABSTRACT

An acoustic lethal ovitrap, comprising a tray defining an inner space and having a floor which slopes downwardly toward a center point, and also having a side wall defining a curved internal radius; a housing mounted within the tray; a transducer and power/control unit mounted within the housing for generating acoustic energy at a desired wavelength; a solar panel mounted on the housing and producing power for the transducer and power/control unit of the apparatus; wherein the tray captures water and attracts mosquitos to the water within the tray, and the transducer within the housing generates acoustic energy sufficient to kill mosquitos as they are attracted to the device.

9 Claims, 18 Drawing Sheets

(58) Field of Classification Search
USPC .......................................... 43/107, 112, 122
See application file for complete search history.

(56) References Cited

U.S. PATENT DOCUMENTS

| | | | | |
|---|---|---|---|---|
| 5,896,697 A * | 4/1999 | Kang | ...................... | A01M 1/04 |
| | | | | 43/133 |
| 6,088,949 A | 7/2000 | Nicosia et al. | | |
| 6,298,011 B1 | 10/2001 | Nyberg | | |
| 6,665,979 B1 * | 12/2003 | Hsu | ...................... | A01M 1/223 |
| | | | | 43/107 |
| 8,479,438 B1 | 7/2013 | Wilhelmi | | |
| 10,021,869 B1 * | 7/2018 | Cogley | ................ | A01M 1/145 |
| 2003/0061757 A1 * | 4/2003 | Askin | .................. | A01M 1/223 |
| | | | | 43/112 |
| 2003/0106498 A1 * | 6/2003 | Mersits | ................ | A01K 5/0142 |
| | | | | 119/61.53 |
| 2006/0053683 A1 | 3/2006 | Lau | | |
| 2006/0090391 A1 * | 5/2006 | Huang | .................. | A01M 1/106 |
| | | | | 43/107 |
| 2007/0074447 A1 | 4/2007 | Kalogroulis | | |
| 2010/0186284 A1 * | 7/2010 | Hyde | .................... | A01M 1/026 |
| | | | | 43/132.1 |
| 2010/0229458 A1 * | 9/2010 | Bowden | ................ | A01M 1/106 |
| | | | | 43/107 |
| 2012/0017834 A1 * | 1/2012 | Holland | ................ | A01M 1/106 |
| | | | | 119/6.5 |
| 2014/0202961 A1 | 7/2014 | Marka et al. | | |
| 2015/0082687 A1 | 3/2015 | Neff | | |
| 2017/0080255 A1 * | 3/2017 | Law | ...................... | B06B 1/0622 |

OTHER PUBLICATIONS

Indian examination report for patent application No. 201817043285 dated Feb. 23, 2021.

* cited by examiner

ACOUSTIC LETHAL OVITRAP

BACKGROUND OF THE INVENTION

Mosquito borne disease has been a scourge to mankind since our beginnings. These diseases have routinely reached epidemic proportions, impacting the health and wellbeing of millions. The dynamics of the modern world such as the rapid urbanization and economic growth of tropical regions, air travel and the ever present climate changes dramatically increase the geographic bounds of mosquito related diseases. Simultaneously, the increased use of pesticides has resulted in mosquitoes rapidly developing immunity. Due to regulations and public resistance, many pesticides have been eliminated and use in many areas has been curtailed. New approaches to mosquito control are necessary. An approach based on a surveillance tool has shown promise as one for controlling population. Lethal ovitraps are devices used to trap and contain mosquito eggs halting the life cycle of the insect in the process. The original use was to monitor spread of *Aedes* mosquitoes. Researchers have found adding lethal substances such as pesticide or larvicide to the ovitrap could control the population of target species. Studies have shown that population densities can be reduced with sufficient large number of frequently-serviced traps.

Existing lethal ovitraps suffer significant deficiencies such as the need for frequent servicing as noted by the United Nations World Health Organization. Current devices which are not serviced become a breeding site and result in adding to the population. The toxic pesticides only are effective for a short period and need to be replaced, and the handling of these toxins is dangerous and a liability when non-trained consumers need this product. Mosquitoes have and also will further develop resistance to the currently available pesticides that are used in traps. The current design approaches limit the number of species they attract, quite often the traps have been designed for a single species. Traps that utilize mechanical fans are subject to fail and are limited to availability of domestic electricity. The need for a non-toxic set-and-forget multi-species attractant trap is necessary.

SUMMARY OF THE INVENTION

The present invention incorporates a novel non-chemical technique as a lethal agent and unique trap configuration to attract multiple species simultaneously. The invention is based on a solar powered active acoustic source introducing sound energy into a rainwater filled trap which is resonant with the dorsal tracheal trunk. This is an organ that extends the entire abdomen and thorax of the mosquito larvae. When exposed to this energy it ruptures instantly. The solar power and acoustic generator have no moving parts and since the design is so precisely targeted there is significant excess power to operate attracting LED lights. Females of various species are lured by multiple attractants. Some of the strongest are non-moving water, movement, light in blue spectrum, shade areas, and several odors. An additional attractant has been found to be automobile tires and material from used tires. Since different species are in flight during different periods of the day, one can attract both day and twilight fliers by simulating movement with LED lights for the twilight fliers and open water source for the difficult to kill *Aedes* day fliers.

The mechanical design of the inventive trap incorporates several novel characteristics. The bottom slopes to the center where the acoustic source is located. This ensures that water and larvae will always be exposed to the sound energy until water evaporates. Therefore, the active agent is ever-present and the device does not become a breeding site. The acoustic source is elevated by a small space and the novel design also cradles the integrated active agent module that contains the solar cell, electronics controller, acoustic source, and LED lights. Overflow ports allow for natural rain fall to keep the trap hydrated partially up the side walls providing enough horizontal space for the *Aedes* mosquitoes to lay her eggs. Most other species will oviposition directly on the water. The top of the side edges has a unique shade design with an internal concave radius. This allows some shade in the trap no matter the time of daylight which is attractive to *Aedes* as well as other species.

The integrated active agent module is a unique integration of solar cell, amplifier, micro controller, acoustic source, and moving LED strips. The acoustic source is uniquely designed to generate a toroidal beam pattern using a tuned piezo ceramic cylinder. This allows for even distribution radially throughout the trap without wasting energy directly below or above the center.

Unique mounting options are provided. Construction of the top of the trap does not contour with the internal concave radius but is squared to provide sufficient strength to allow three point hanging option. Internally the bottom is sloped but the exterior trap bottom is flat allowing versatile locations installation.

All of these features, unique to lethal ovitraps give a true set and forget, multi-species including all daylight and twilight fliers device. It does not require handling toxic pesticides which mosquito become resistant and will not become an accidental breeding site.

BRIEF DESCRIPTION OF THE DRAWINGS

A detailed description of preferred embodiments of the invention appears hereinbelow, with reference to the attached drawings, wherein.

DETAILED DESCRIPTION

The invention relates to an acoustic lethal ovitrap 10, that is, a trap for trapping various species of mosquito using acoustics as the lethal agent and having advantageous components to allow for a safe, pesticide-free trap which is effective for all species of mosquitos.

Figure 1:
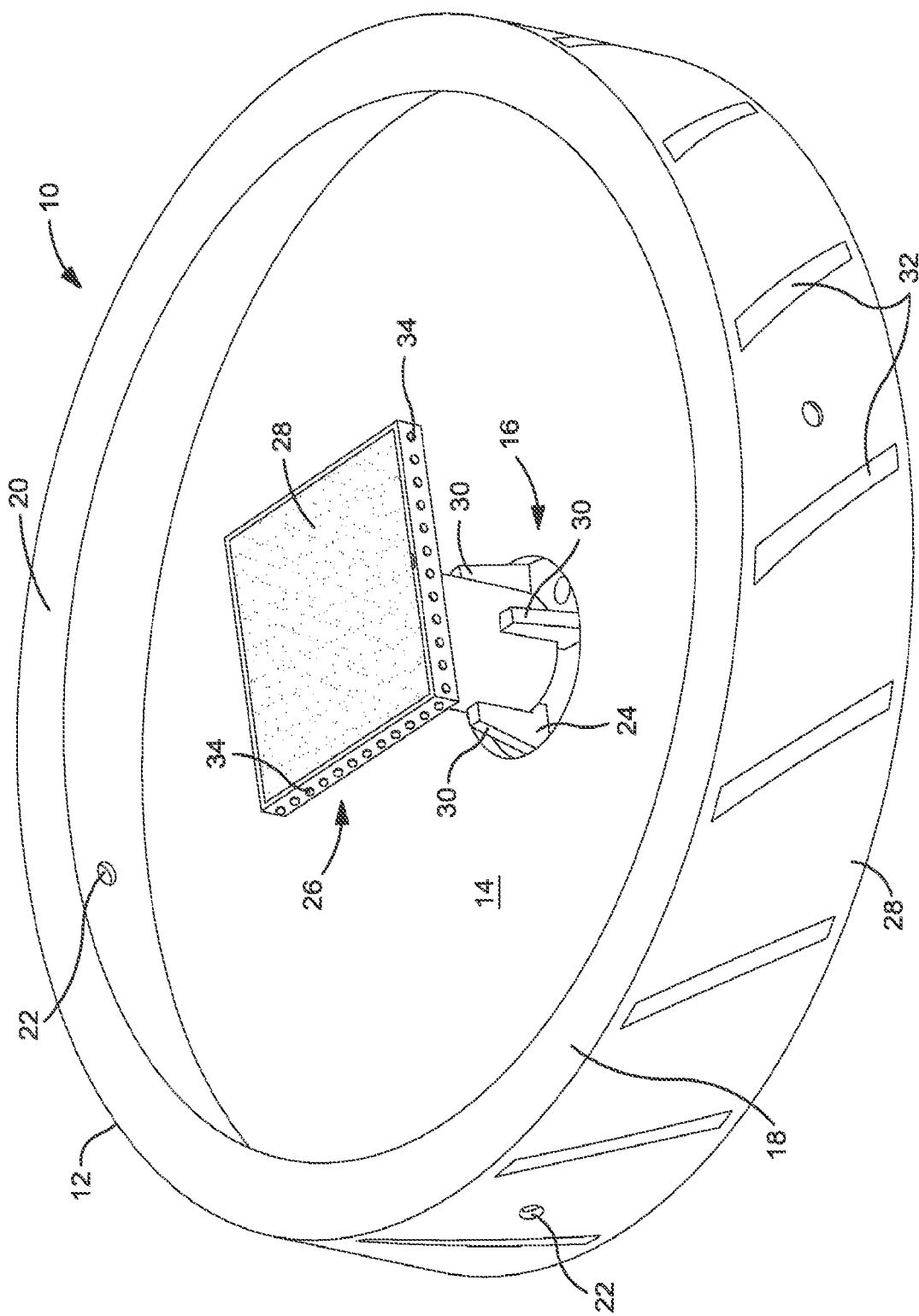
FIG. 1 is perspective view of an acoustic lethal ovitrap in accordance with the present invention.
Figure 2:
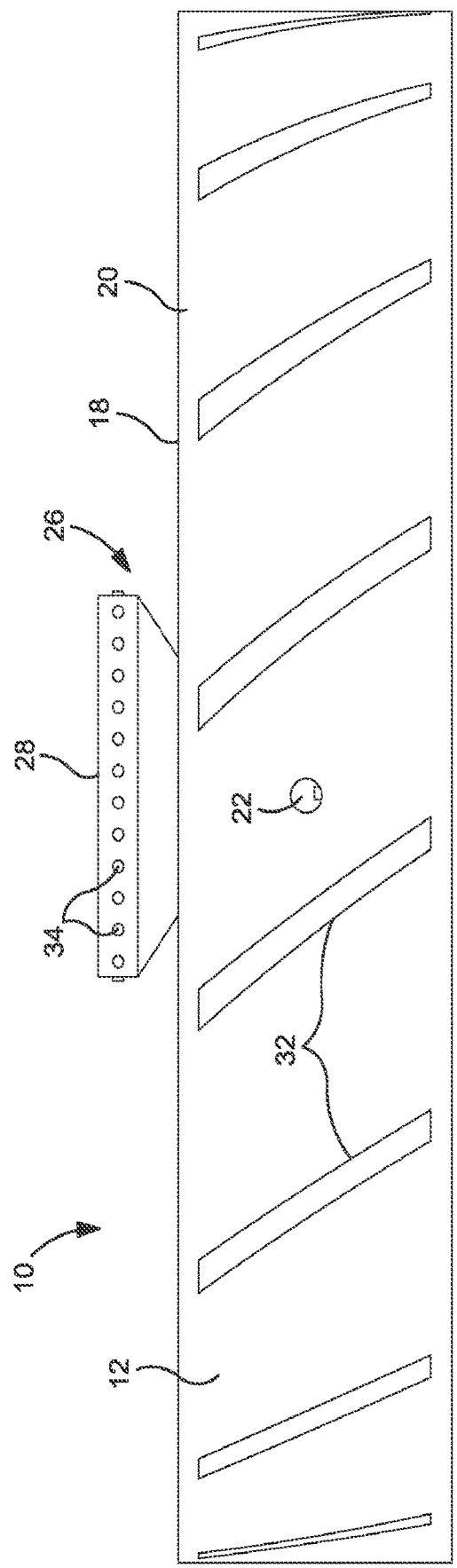
FIG. 2 is a side view of the embodiment of FIG. 1.
Figure 3:
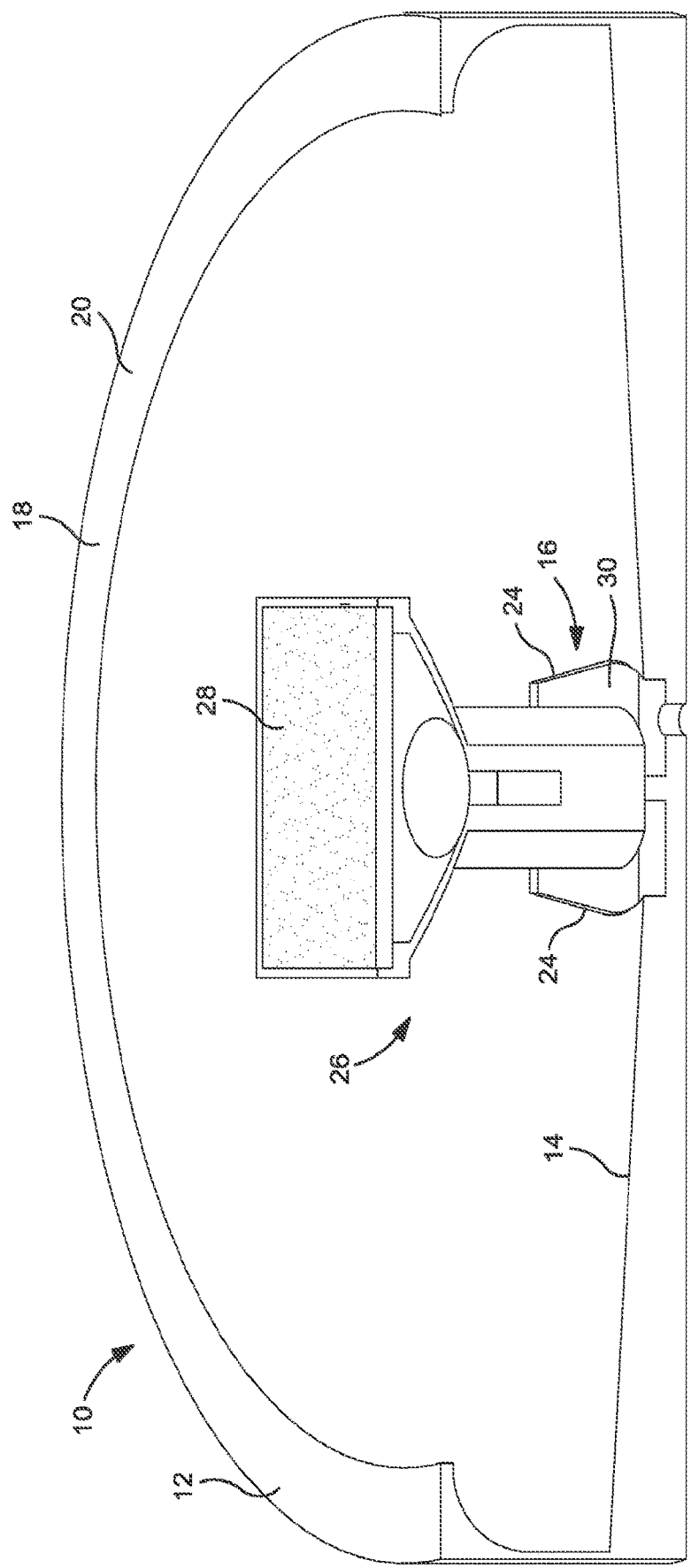
FIG. 3 is a cross-sectional view of the embodiment of FIG. 1.

The apparatus includes a tray 12, in this embodiment, a generally circular open-topped tray as illustrated in FIGS. 1-4, and also as illustrated in FIGS. 9-16. The tray has a bottom 14 which preferably slopes toward the center 16 as illustrated in FIG. 3, and a sidewall 18 which can have a thickened upper edge 20 and an inner wall which curves inwardly to the increased thickness. This structure with internal radius provides for hanger strength, and also for a shadowed area which is attractive to mosquitos as described above.

The tray can also have a plurality of drainage ports 22 as shown in FIGS. 1-4, and these drainage ports can help to prevent over-filling of the tray with rainwater, and further help to ensure maintenance of the water at a desired level within the tray.

Figure 4:
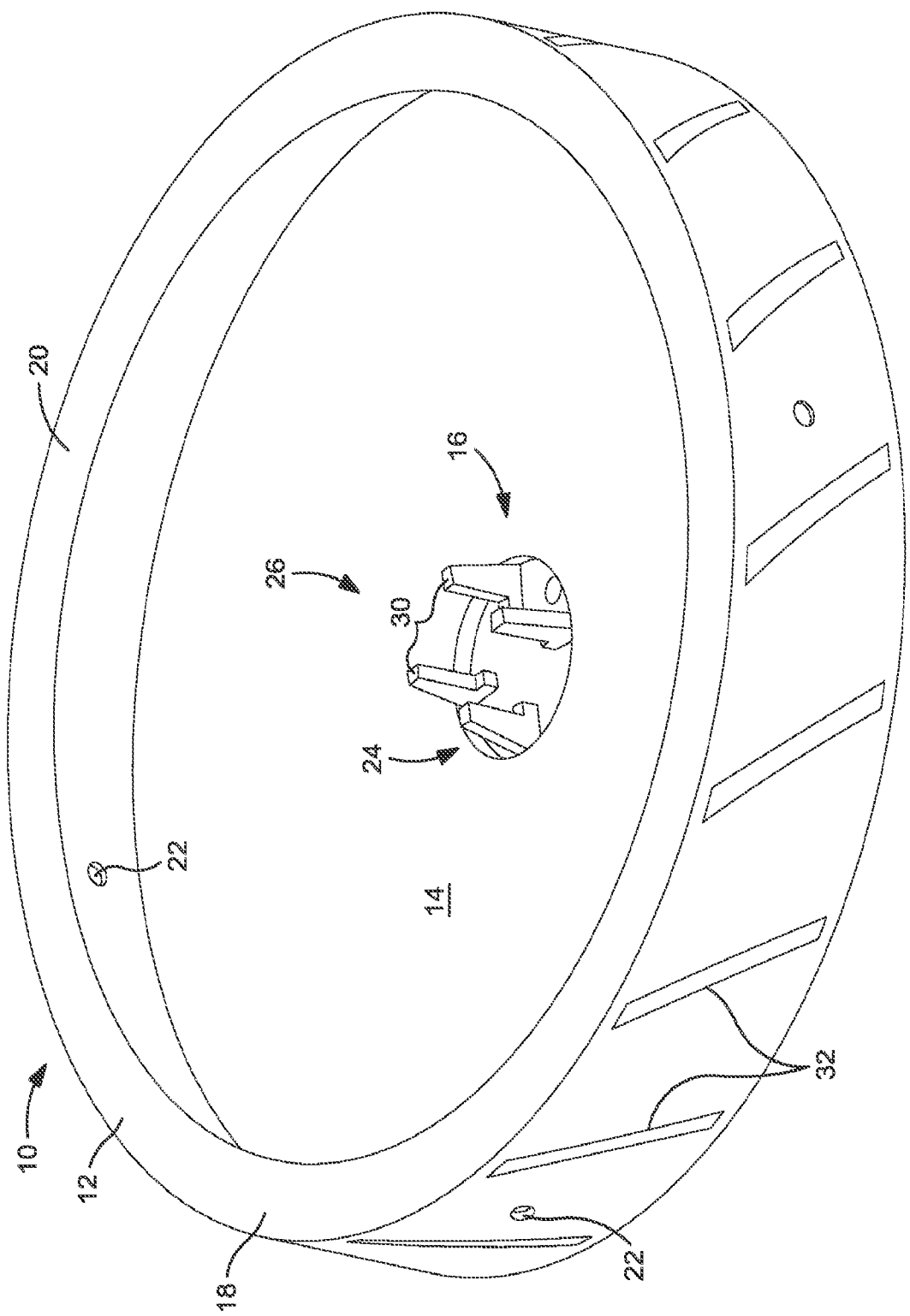
FIG. 4 is a perspective view of the base portion of the embodiment of FIG. 1.
Figure 5:
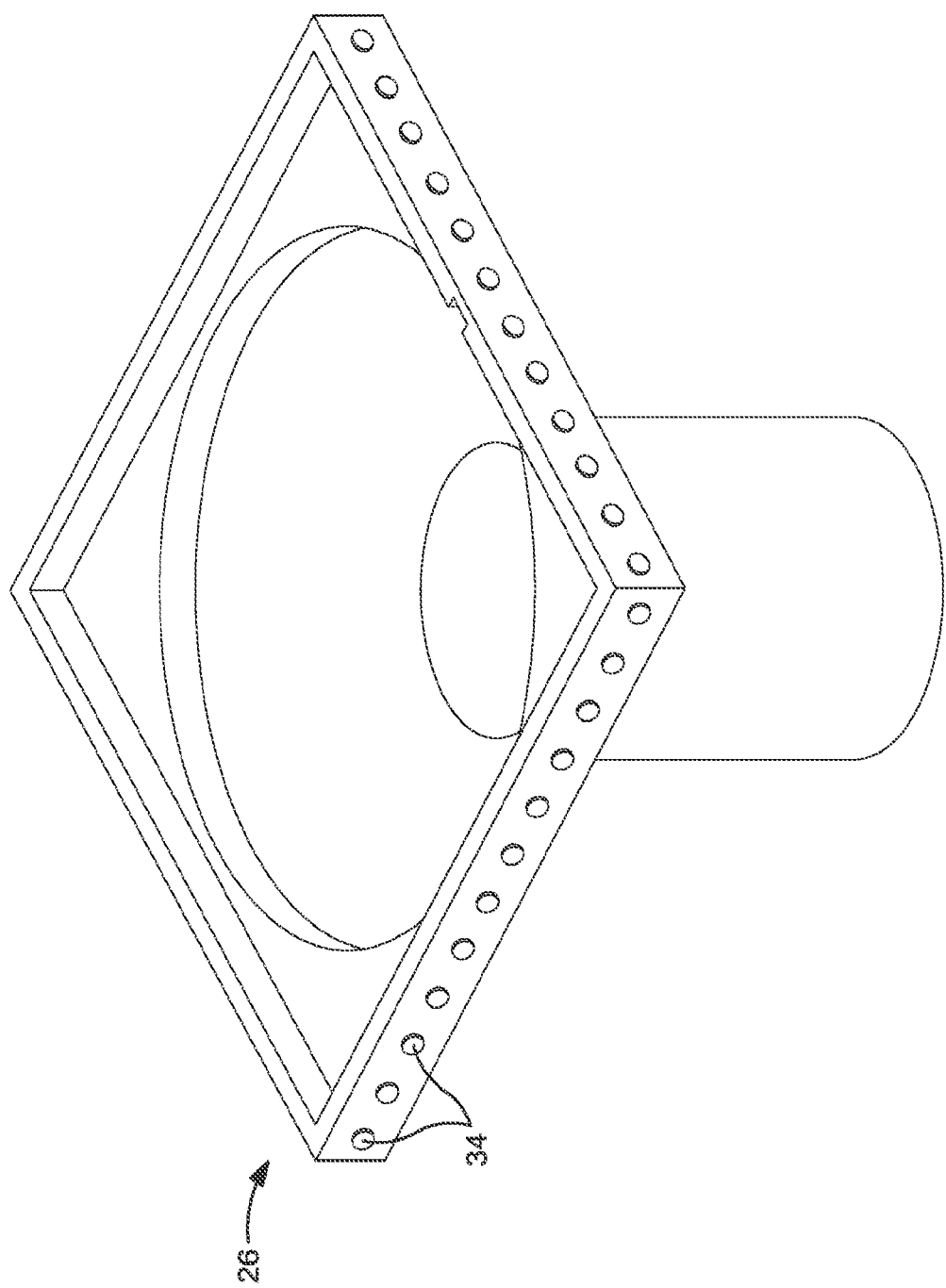
FIG. 5 illustrates a housing for components of the present invention and support for solar panel and LED components of the embodiment of FIG. 1.
Figure 6:
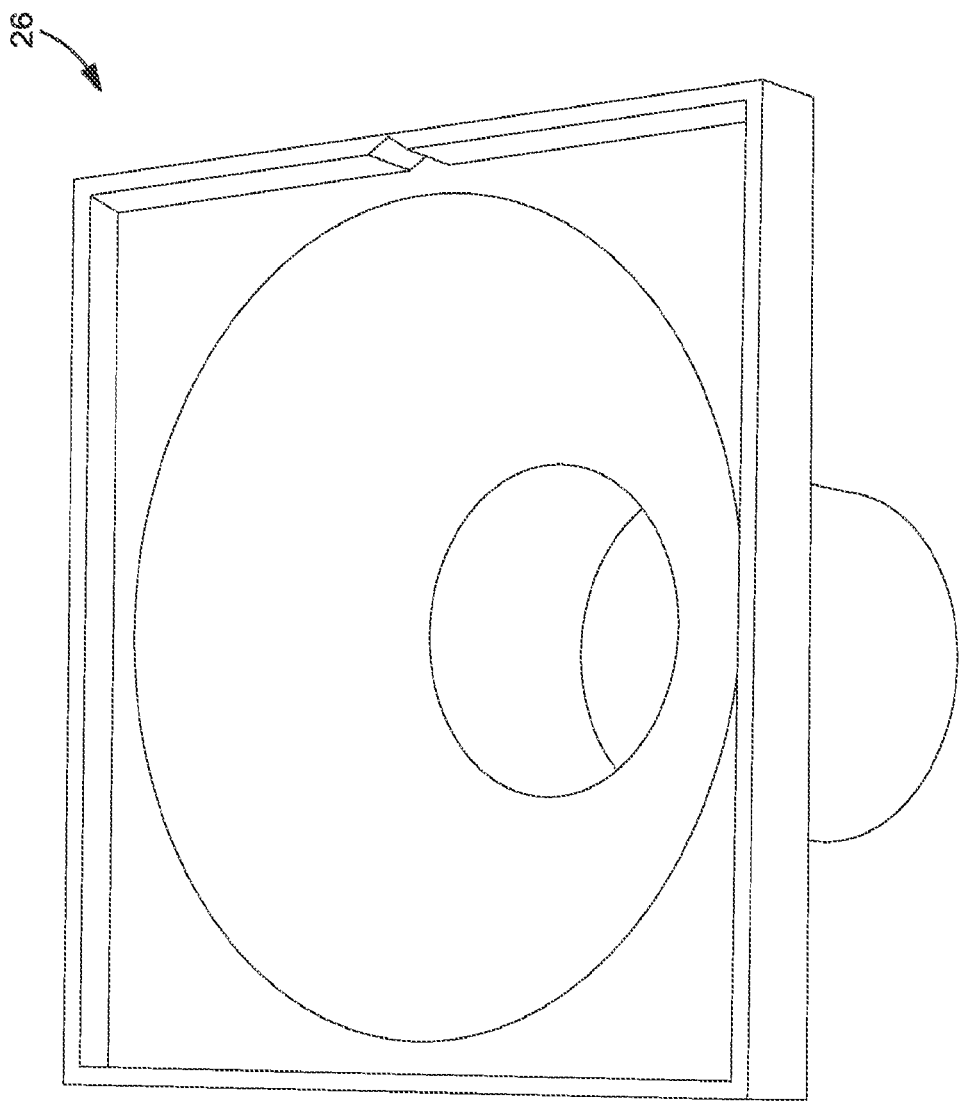
FIG. 6 is a further perspective view of the housing similar to that of FIG. 5.
Figure 7:
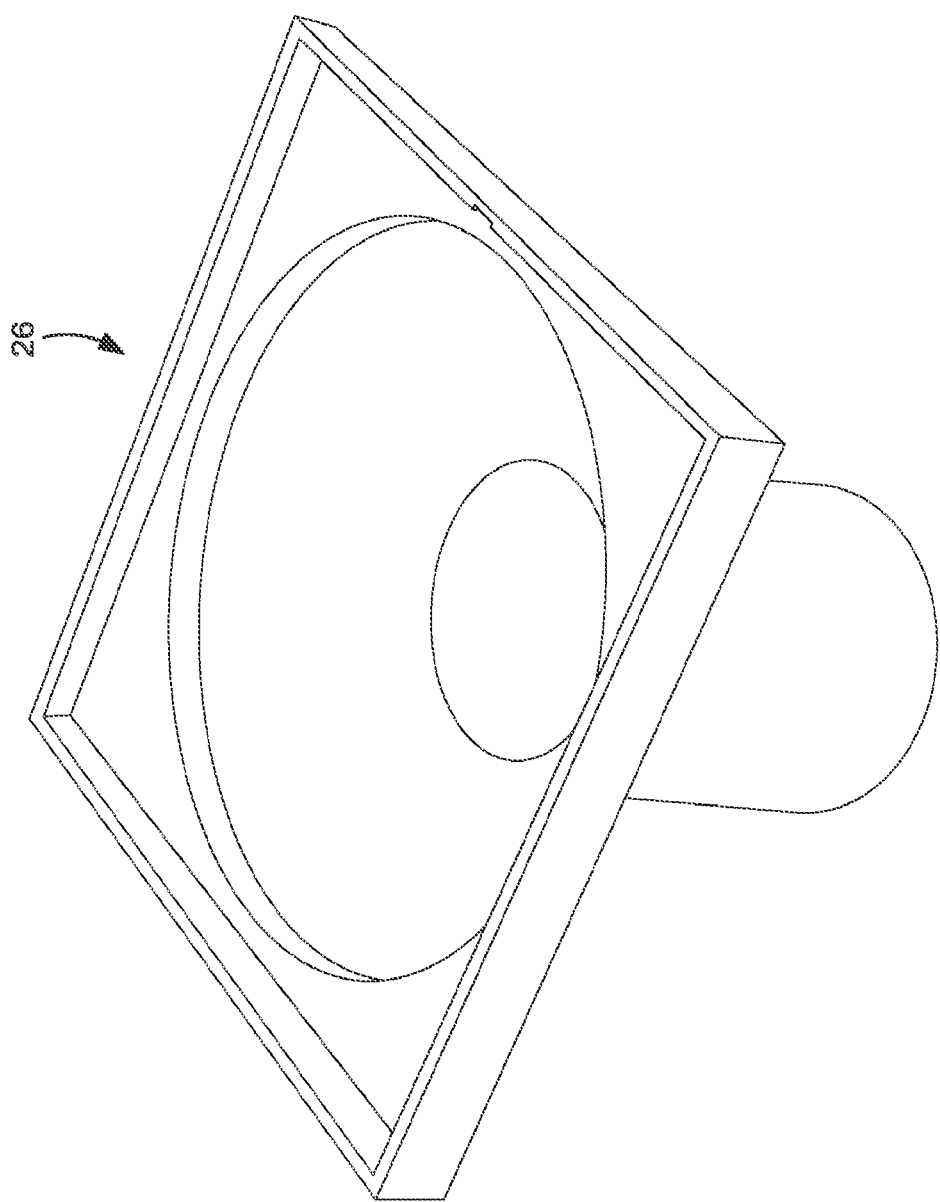
FIG. 7 is a further perspective view of a housing according to the invention.

In the central portion of the tray, a holder 24 is provided for holding a housing 26 which contains electronics as well as a solar panel 28, as will be discussed further below. This holding structure can be provided in the form of four upwardly extending prongs 30 as shown in FIG. 4 which will hold and stabilize the housing 26 referred to above. Other structures would also suffice.

The tray 12 preferably has a two-texture black interior, smooth below the drain ports and rough above the drain ports, as this is helpful in attracting mosquitos. Further, the outside sidewall 28 of the tray can be provided having a blue/white variegated exterior 32, as this helps to attract mosquitos.

As shown in FIG. 3, a housing 26 is positioned and held by the central mounting structure 30 of the tray, and this housing serves to contain the various functioning components of the apparatus, and also serves to support a solar panel for powering these components. The solar panel 28 is shown as the square component held in the upper portion of the housing. The housing contains a transducer and generator of acoustic energy which, when tuned to be resonant with the dorsal tracheal trunk of mosquitos, ruptures this portion of the mosquito, thereby killing the mosquito.

The components of this device can be in accordance with the disclosure of U.S. Pat. No. 6,298,011. This patent is incorporated herein by reference.

The housing 26 can also have, preferably along an outside edge of the upper portion, a plurality of blue LED lights 34, the operation of which is controlled by electronics within the housing and powered by the solar panel, such that the LEDs, referred to as "blue motion LEDs", can be operated to attract mosquitos to the trap.

Figure 8:
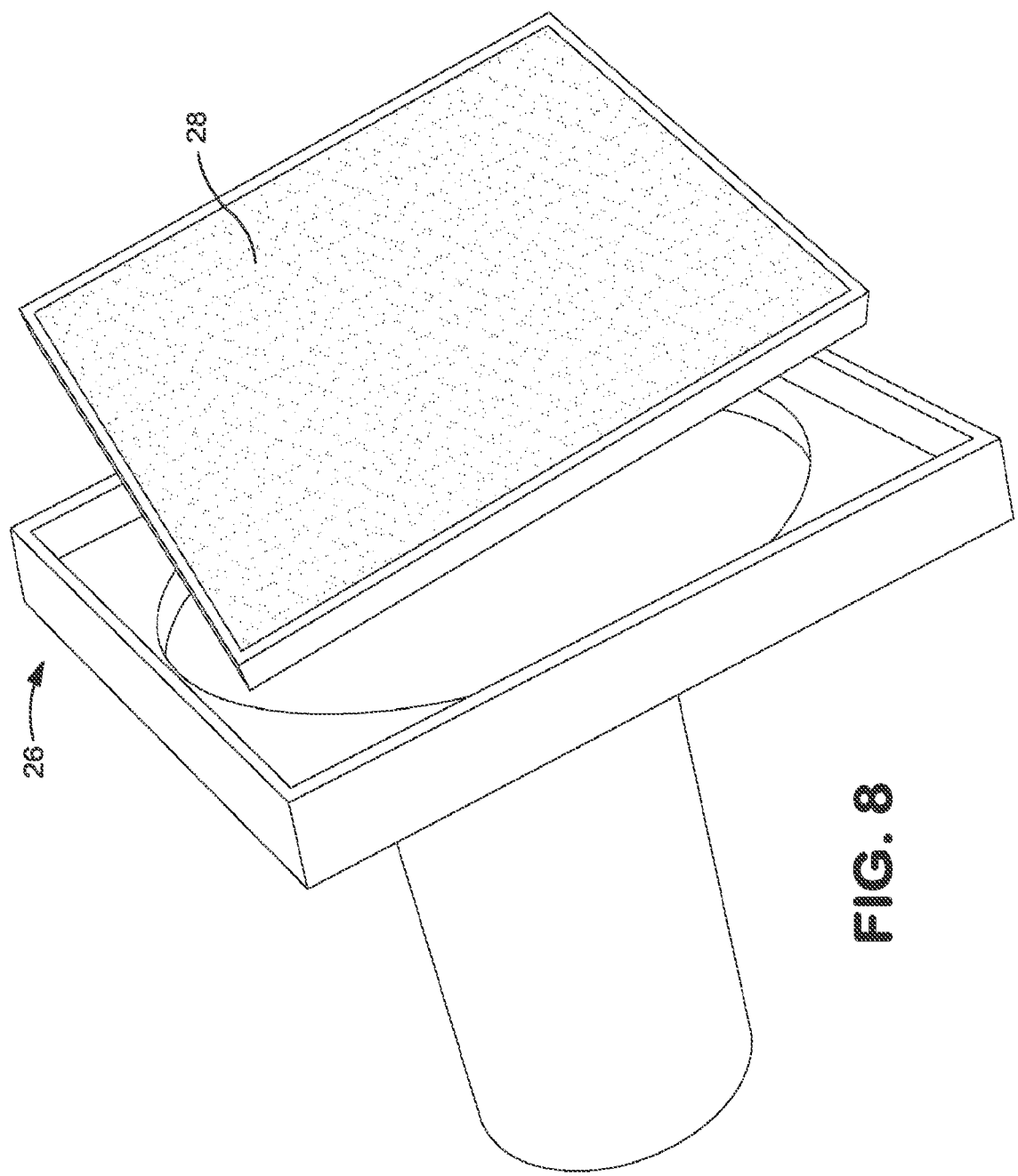
FIG. 8 is a perspective view of a housing according to the invention including solar panels.
Figure 9:
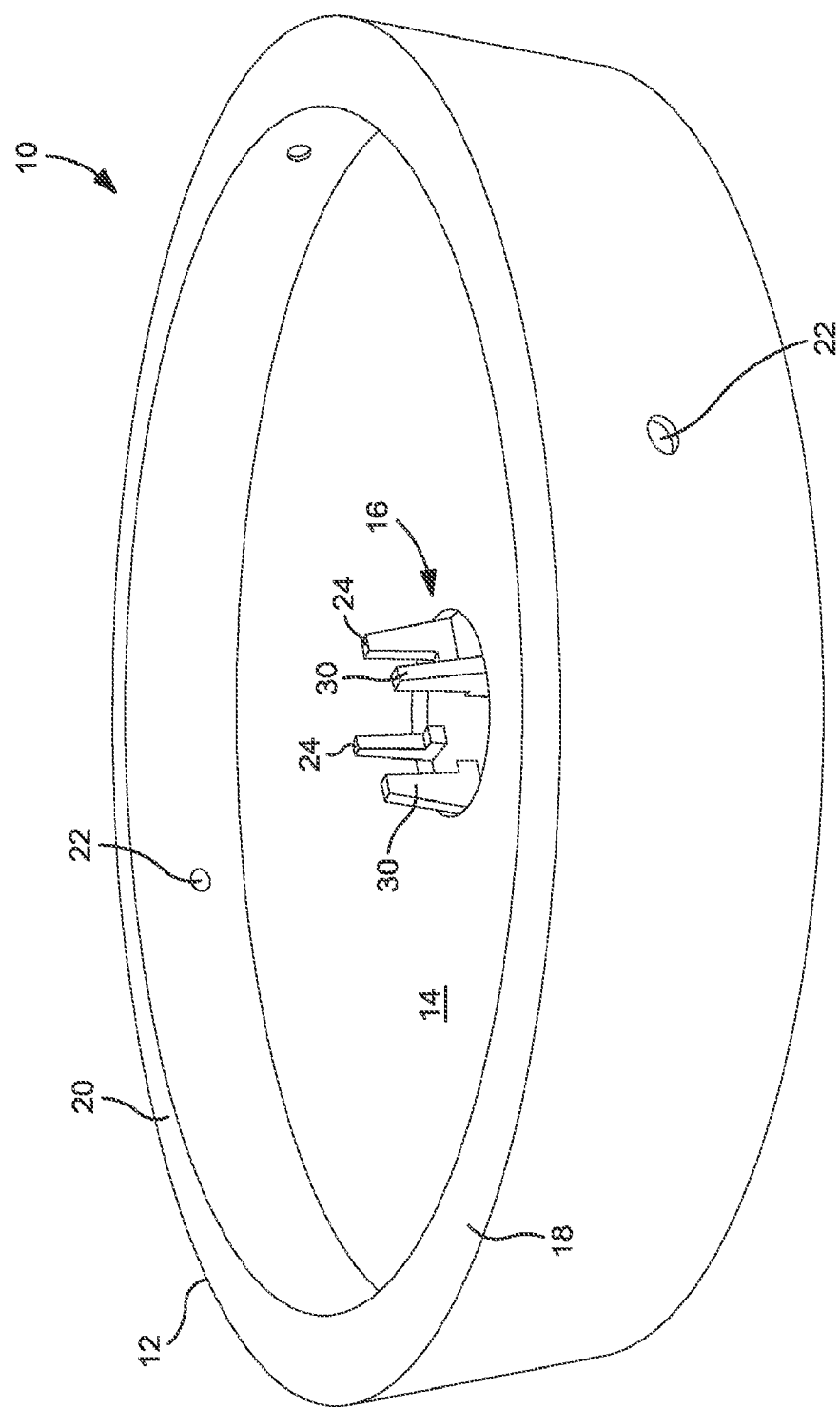
FIG. 9 is a perspective view of a tray for defining the water reservoir and holding the other components of the present invention.

FIGS. 5-18 show further illustrations of the housing 26, and FIG. 8 includes a solar panel to be held by the housing.

Figure 10:
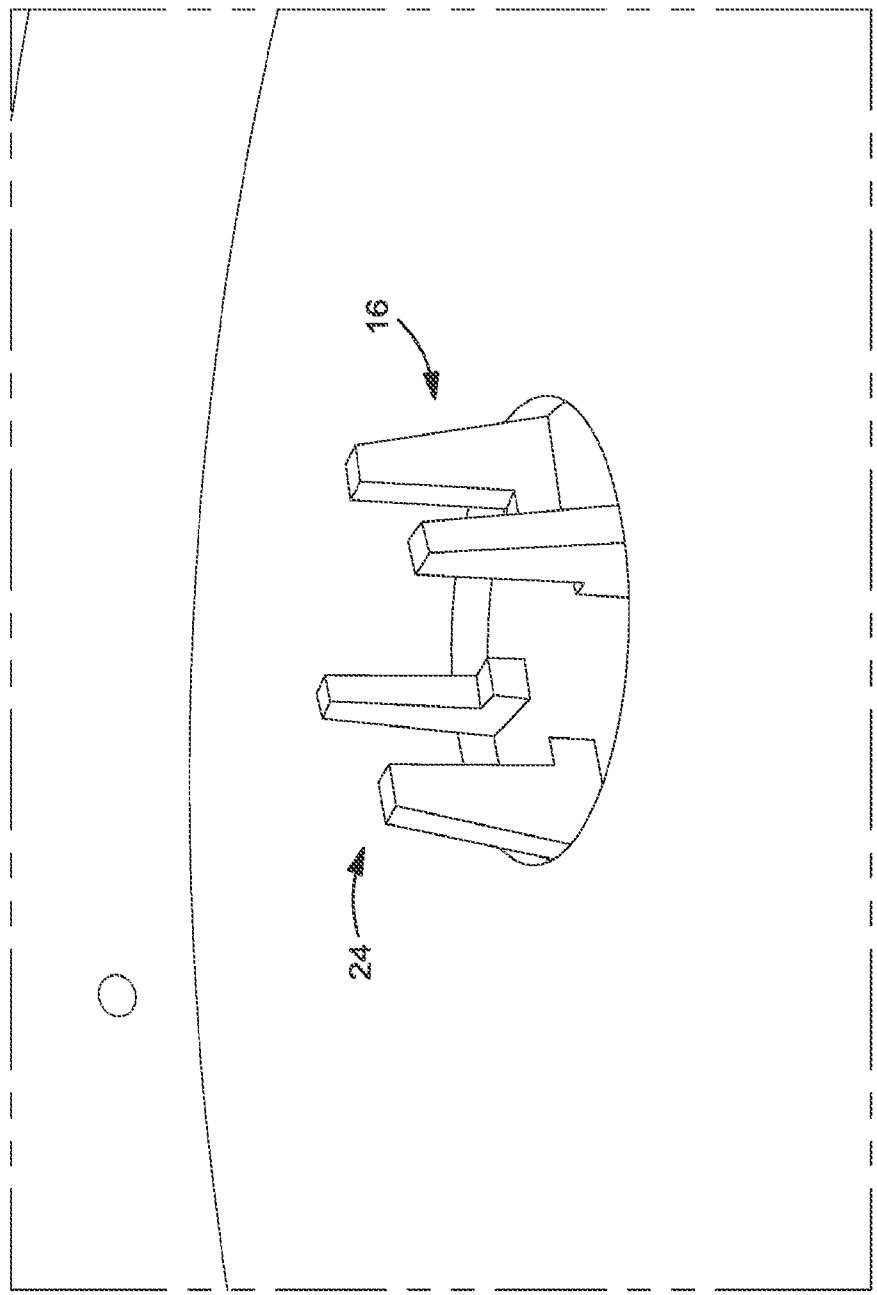
FIG. 10 is an enlarged view of a central portion of the tray.
Figure 11:
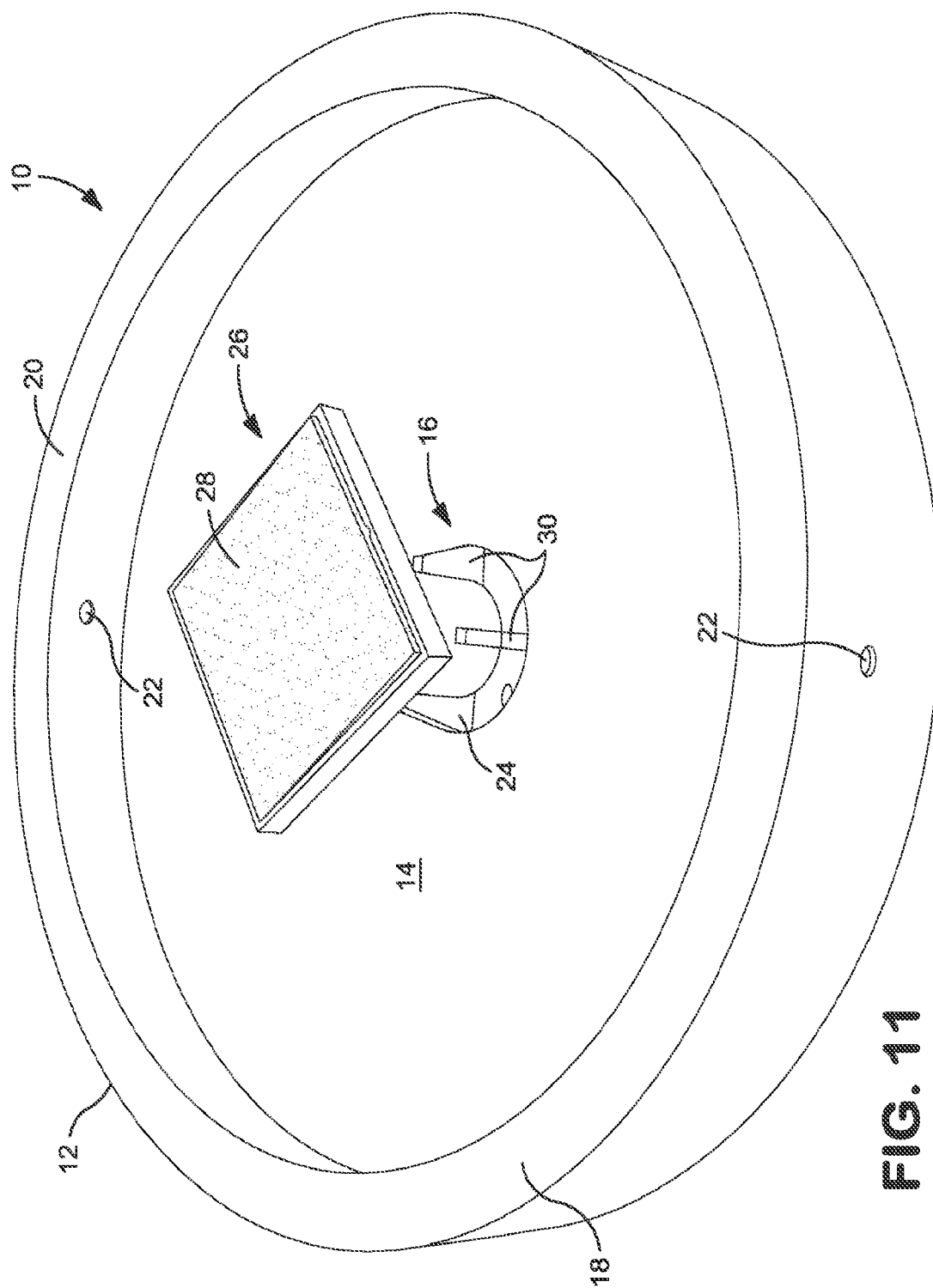
FIG. 11 is a further view of the tray of FIG. 9, with the housing and solar panel in place.
Figure 12:
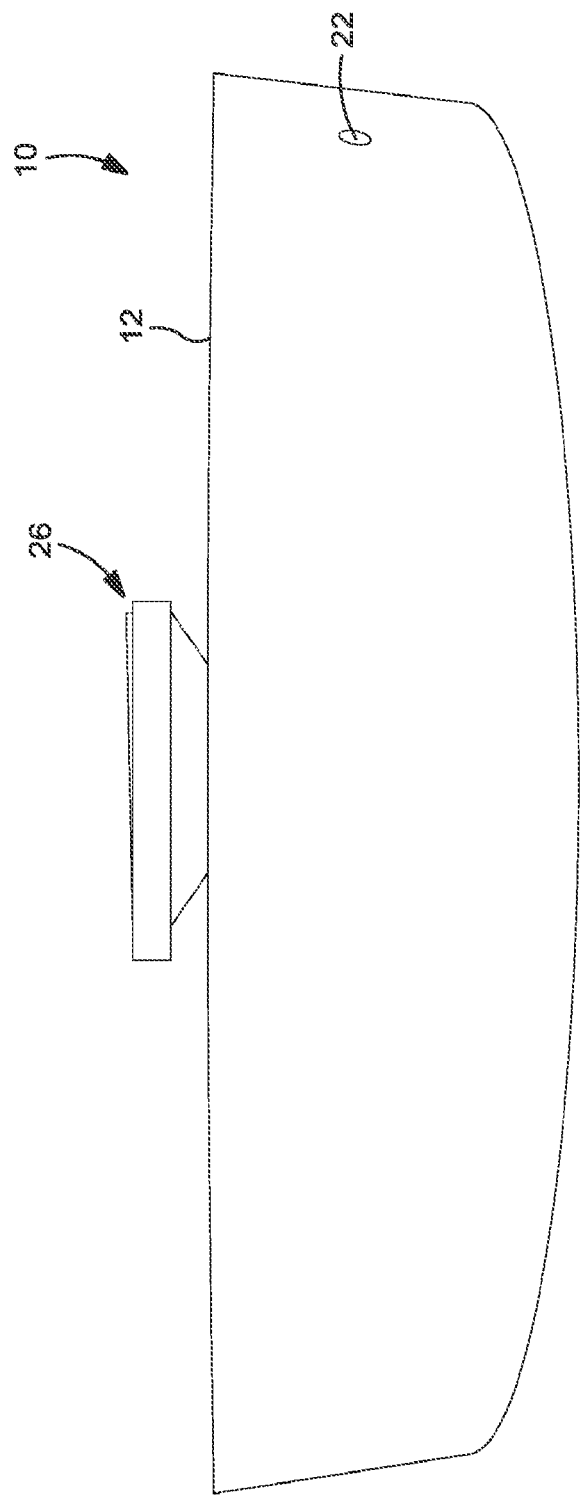
FIG. 12 is a side view of the tray of FIG. 9, with housing and solar panel in place.
Figure 13:
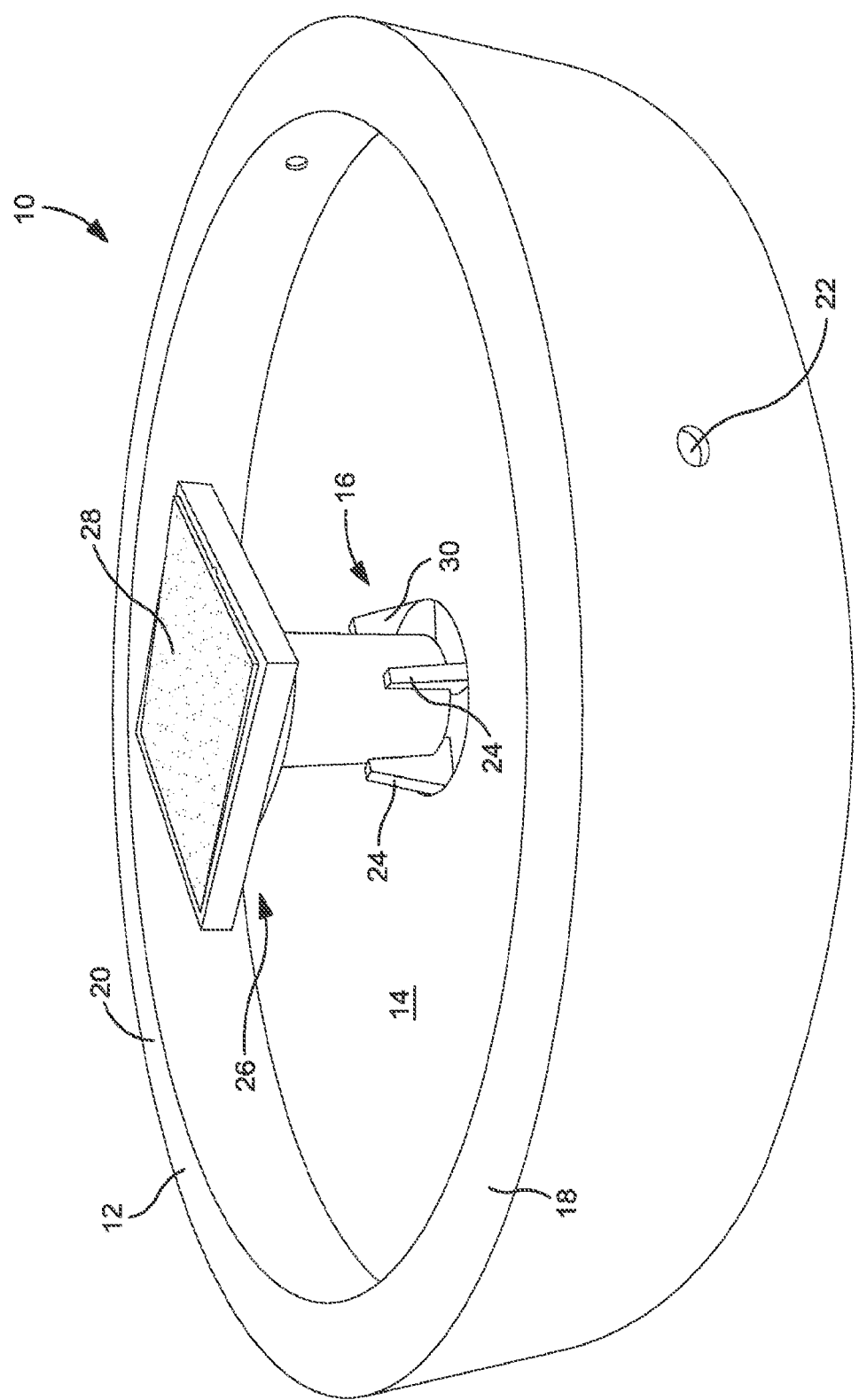
FIG. 13 is a perspective view of the tray of FIG. 9, with housing and solar panel in place.
Figure 14:
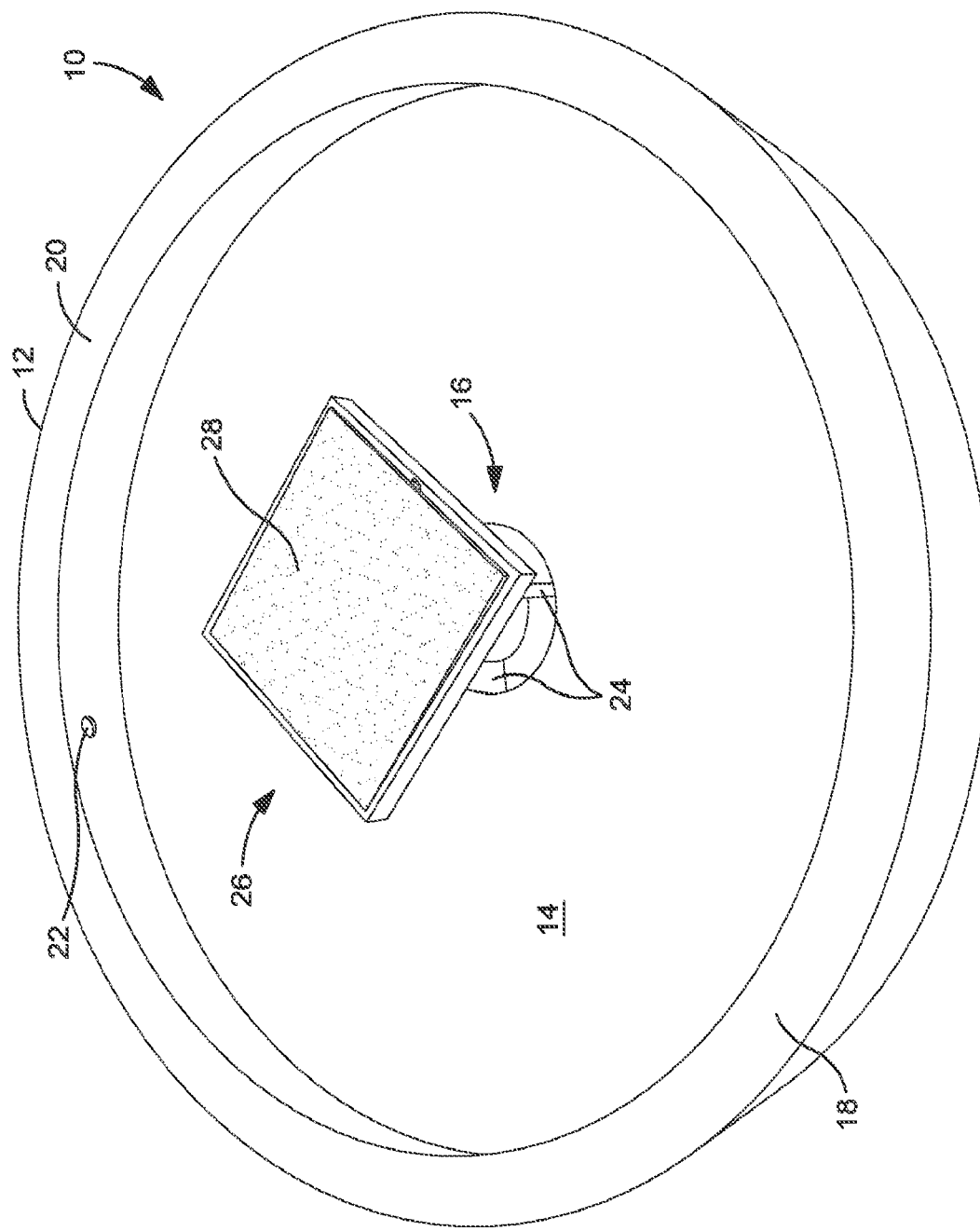
FIG. 14 is a top view of the tray of FIG. 9, with housing and solar panel in place.
Figure 15:
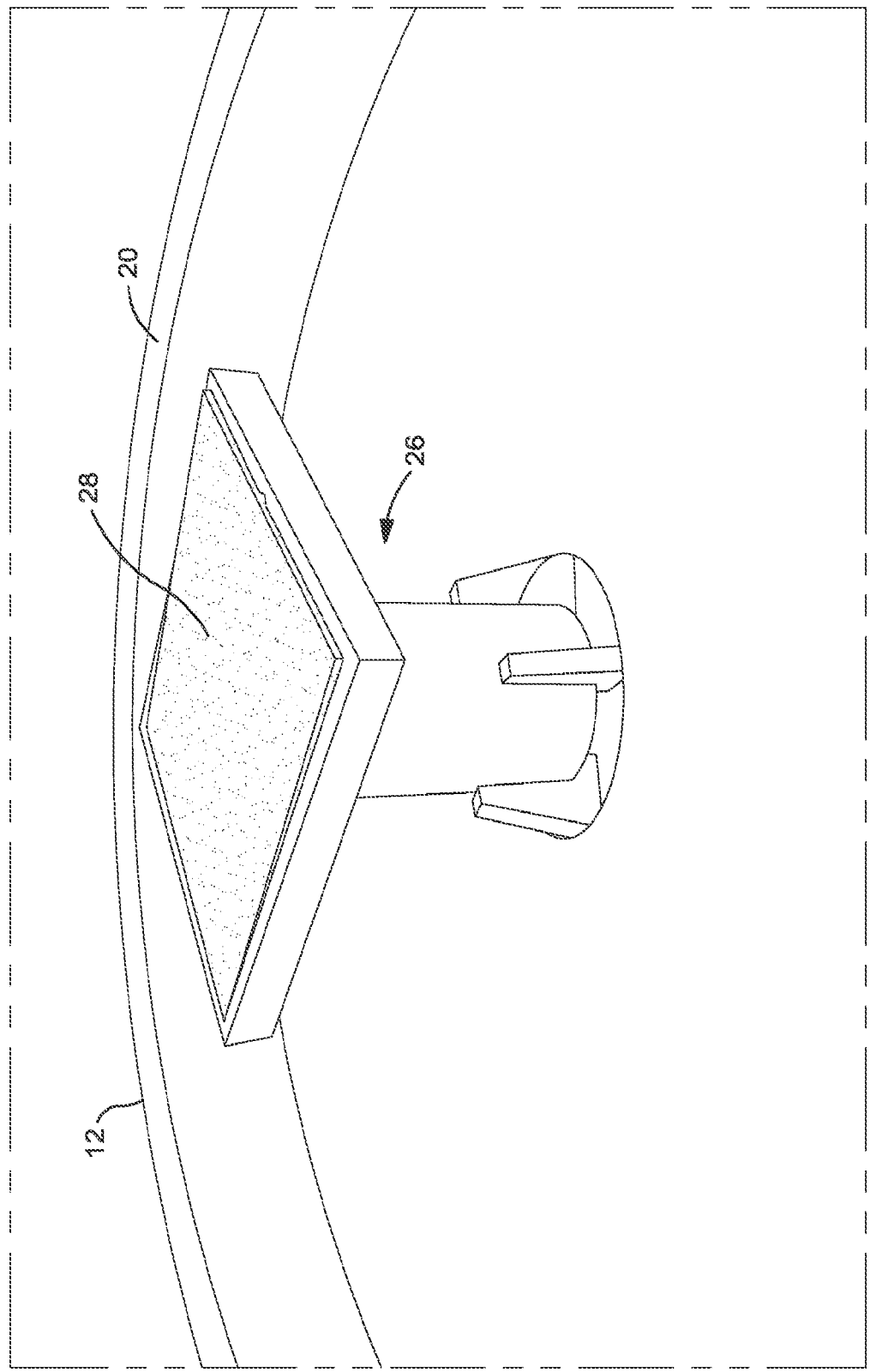
FIG. 15 is an enlarged perspective view of the housing and solar panel in position with the central structure of the tray in accordance with the present invention.
Figure 16:
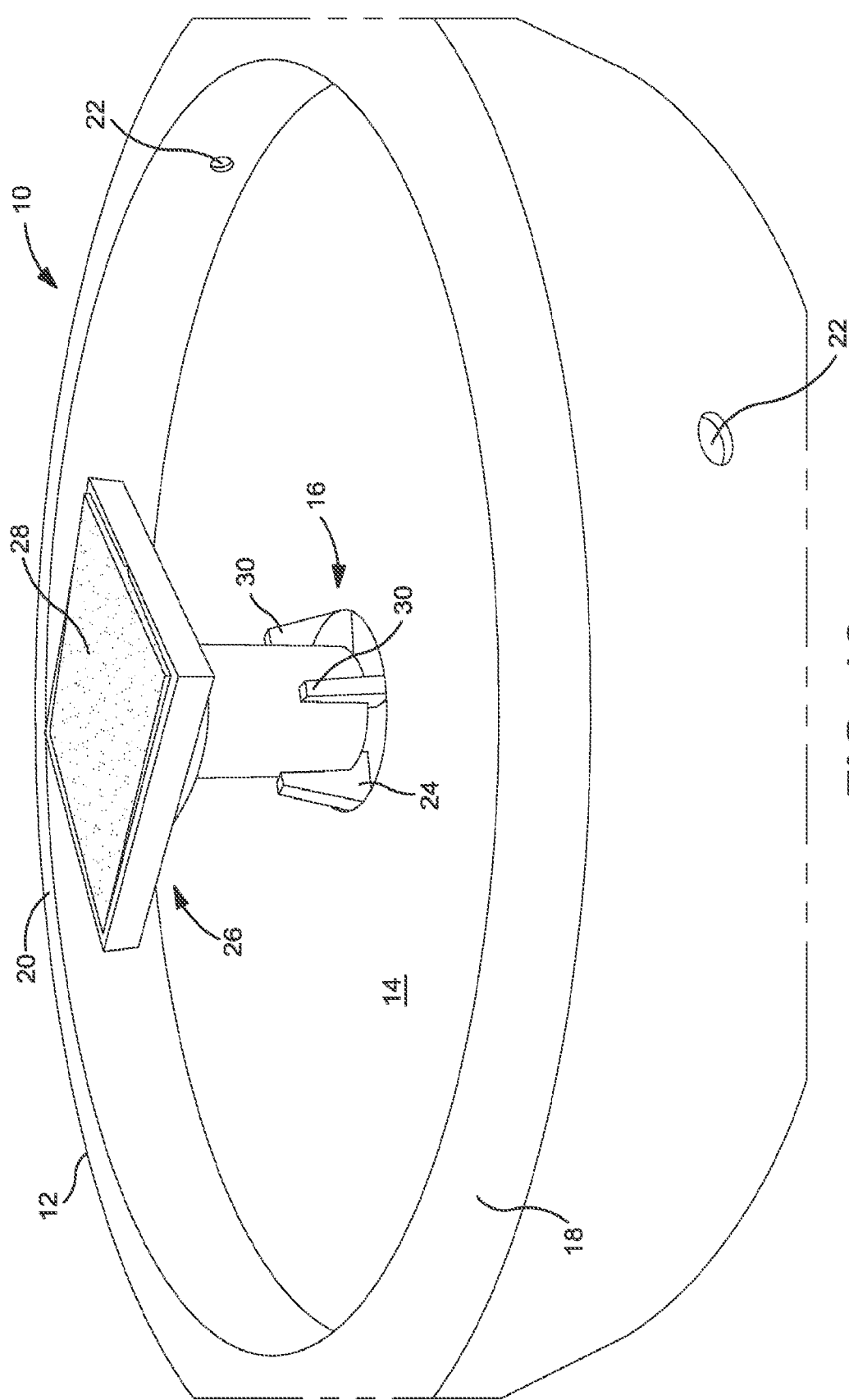
FIG. 16 is a further perspective view of the tray with housing and solar panel according to the invention.
Figure 17:
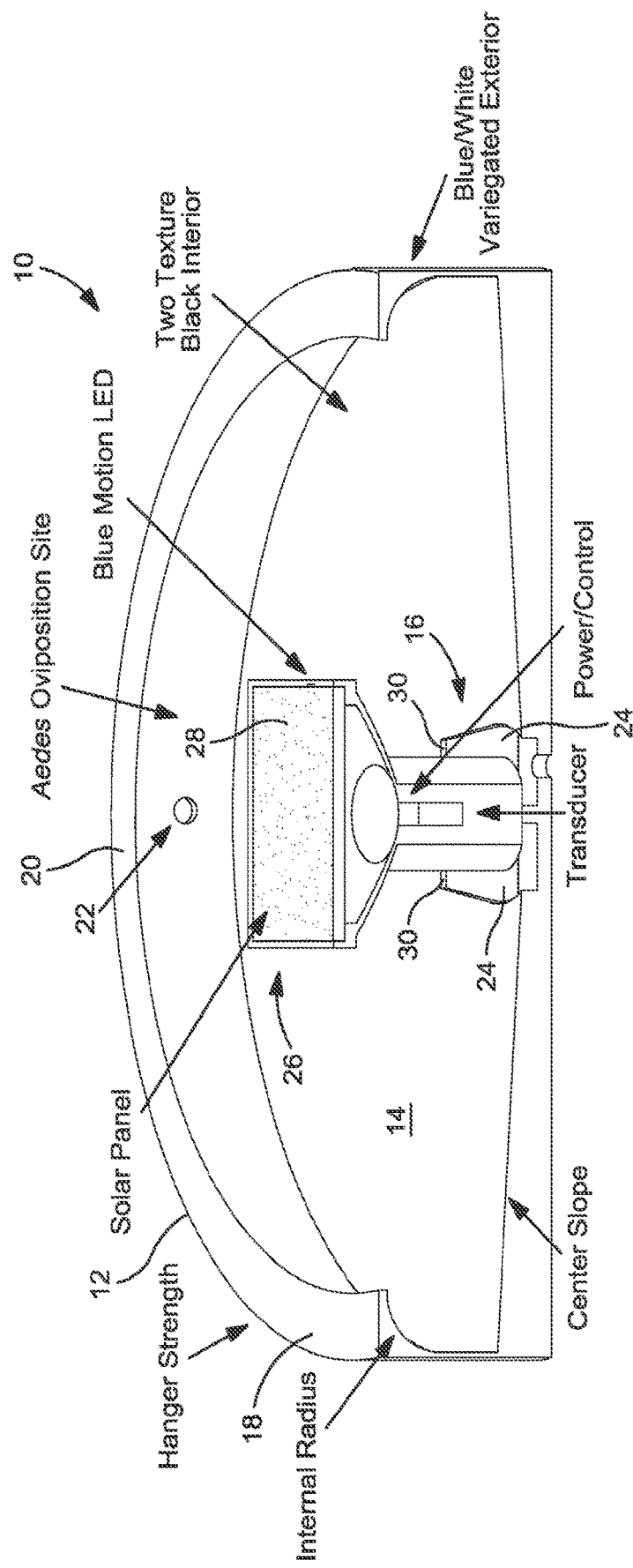
FIG. 17 is an itemized illustration of an apparatus according to the invention identifying key features of the invention.
Figure 18:
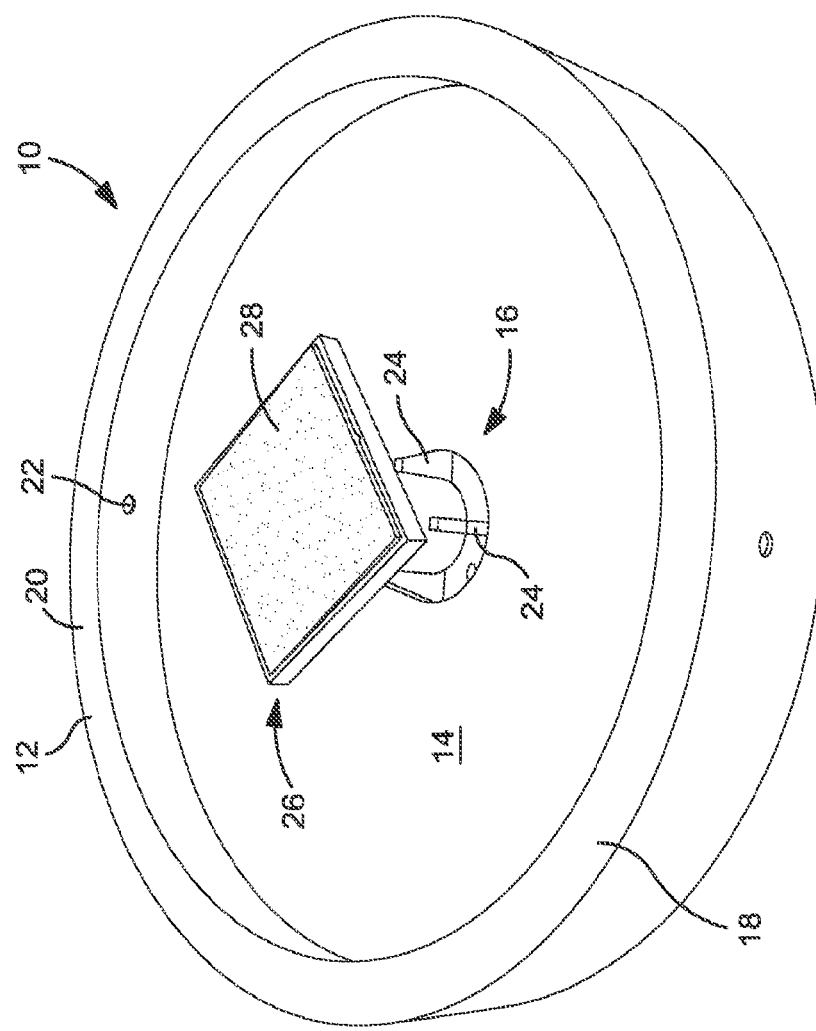
FIG. 18 is a further view of an apparatus according to the invention with further key features identified.

FIG. 10 shows an enlarged view of center 16 and a holder 24 according to the invention.

It should be appreciated that the tray and the housing are constructed and designed to attract mosquitos. Further, the tray is also designed to collect rain water such that a desired level of water can be maintained in the device without any maintenance by the user.

The solar panel obtains and stores sufficient power to operate the blue motion LEDs, and also to operate the transducer to generate acoustic energy at the desired wavelength.

It should be readily appreciated that the appatus in accordance with the invention is a very simple and effective, yet maintenance free, apparatus and system for trapping and killing mosquitos, specifically mosquito larvae, and the apparatus according to the invention is not accompanied by any of the drawbacks identified above with respect to pesticides and the like.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. An acoustic lethal ovitrap, comprising:
   a tray defining an inner space and having a floor which slopes downwardly toward a center point, and also having a side wall defining a curved internal radius;
   a housing mounted within the tray;
   a transducer and power/control unit mounted within the housing for generating acoustic energy at a desired wavelength;
   a solar panel mounted on the housing and producing power for the transducer and power/control unit of the apparatus;
   wherein the tray captures water and attracts mosquitos to the water within the tray, and the transducer and power/control unit is configured and adapted to generate acoustic energy in water within the tray, the acoustic energy being sufficient to kill mosquitos on or in contact with the water within the tray.

2. The apparatus of claim 1 wherein the transducer generates acoustic energy resonant with a dorsal tracheal trunk of a mosquito.

3. The apparatus of claim 1, wherein the transducer is an acoustic transducer having a cylindrical piezo ceramic for generating sound in a horizontal toroid.

4. The apparatus of claim 1, wherein the tray defines an open top area to expose water to sight of female mosquitos.

5. The apparatus of claim 1, wherein the tray has drain ports in the side wall.

6. The apparatus of claim 5, wherein the tray has a two-textured black interior, such that the interior is smooth below the drain ports and rough above the drain ports.

7. The apparatus of claim 1, further comprising a holder supporting the housing above the floor.

8. The apparatus of claim 1, wherein the side wall has a variegated exterior surface.

9. The apparatus of claim 1, wherein the housing has an upper portion having an outside edge, and further comprising a plurality of blue LED lights arranged on the outside edge.

* * * * *